(12) United States Patent
Chen

(10) Patent No.: US 11,516,712 B2
(45) Date of Patent: Nov. 29, 2022

(54) METHOD AND TERMINAL FOR CELL SELECTION/RESELECTION

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 111 days.

(21) Appl. No.: 16/497,050

(22) PCT Filed: Mar. 23, 2018

(86) PCT No.: PCT/CN2018/080145
§ 371 (c)(1),
(2) Date: Sep. 24, 2019

(87) PCT Pub. No.: WO2018/171709
PCT Pub. Date: Sep. 27, 2018

(65) Prior Publication Data
US 2020/0383014 A1 Dec. 3, 2020

(30) Foreign Application Priority Data
Mar. 24, 2017 (CN) .......................... 201710182378.1

(51) Int. Cl.
*H04W 36/00* (2009.01)
*H04B 17/318* (2015.01)
(Continued)

(52) U.S. Cl.
CPC ...... *H04W 36/0058* (2018.08); *H04B 17/318* (2015.01); *H04L 5/0051* (2013.01);
(Continued)

(58) Field of Classification Search
CPC .......................... H04W 36/0058; H04W 36/08
See application file for complete search history.

(56) References Cited

U.S. PATENT DOCUMENTS 10,848,983 B2 * 11/2020 Martin ................. H04W 16/28
2014/0328327 A1    11/2014 Xiao et al.
(Continued)

FOREIGN PATENT DOCUMENTS

CN            103220704 A      7/2013
CN            105230075 A      1/2016
(Continued)

OTHER PUBLICATIONS

"3rd Generation Partnership Project; Technical Specification Group Radio Access Network; Study on New Radio (NR) Access Technology (Release 14)", 3GPP TR 38.912, V1.0.0, Mar. 2017, France (73 pages).
(Continued)

*Primary Examiner* — Jason E Mattis
(74) *Attorney, Agent, or Firm* — Culhane Meadows PLLC; Stephen J. Weed

(57) ABSTRACT

A method of cell selection/cell reselection and a terminal are provided. The method includes acquiring measurement configuration information of beams, wherein the measurement configuration information includes the number of beams measured by a terminal; measuring the beams based on the measurement configuration information to acquire a measurement result of each beam; performing, based on the measurement result of each beam, the cell selection/cell reselection of a cell in which the terminal camps when the terminal is in an idle state.

16 Claims, 4 Drawing Sheets

(51) Int. Cl.
*H04L 5/00* (2006.01)
*H04L 5/10* (2006.01)
*H04W 24/10* (2009.01)
*H04W 36/08* (2009.01)
*H04W 36/30* (2009.01)
*H04W 48/20* (2009.01)
*H04W 56/00* (2009.01)
*H04W 72/04* (2009.01)

(52) U.S. Cl.
CPC ............... *H04L 5/10* (2013.01); *H04W 24/10* (2013.01); *H04W 36/0083* (2013.01); *H04W 36/08* (2013.01); *H04W 36/30* (2013.01); *H04W 48/20* (2013.01); *H04W 56/001* (2013.01); *H04W 72/046* (2013.01)

(56) References Cited

U.S. PATENT DOCUMENTS

| | | |
|---|---|---|
| 2015/0282034 A1 | 10/2015 | Martin et al. |
| 2016/0242052 A1 | 8/2016 | Kazmi et al. |
| 2016/0262077 A1 | 9/2016 | Zhang et al. |
| 2017/0006613 A1 | 1/2017 | Kakishima et al. |
| 2017/0111886 A1* | 4/2017 | Kim ................ H04W 48/14 |
| 2017/0311252 A1 | 10/2017 | Takano |
| 2018/0035346 A1 | 2/2018 | Fujishiro et al. |
| 2019/0182683 A1* | 6/2019 | Khirallah ............. H04B 7/0695 |
| 2019/0319686 A1* | 10/2019 | Chen, IV ............. H04B 7/088 |
| 2019/0356378 A1* | 11/2019 | Takeda ................ H01Q 25/00 |
| 2020/0022040 A1* | 1/2020 | Chen ................ H04W 56/001 |

FOREIGN PATENT DOCUMENTS

| | | |
|---|---|---|
| CN | 105794255 A | 7/2016 |
| CN | 106105300 A | 11/2016 |
| WO | 2015080648 A1 | 6/2015 |
| WO | 2016121196 A1 | 8/2016 |
| WO | 2016138655 A1 | 9/2016 |
| WO | 2016138873 A1 | 9/2016 |
| WO | 2016163546 A1 | 10/2016 |
| WO | 2017039505 A1 | 3/2017 |

OTHER PUBLICATIONS

1st Chinese Office Action for Chinese Application No. 2017101823781, dated Jun. 4, 2019 (Jun. 4, 2019)—11 pages (English translation—7 pages).
2nd Chinese Office Action for Chinese Application No. 201710182378.1, dated Dec. 6, 2019 (Dec. 6, 2019)—11 pages (English translation—13 pages).
Chinese Search Report for Chinese Application No. 201710182378.1, dated May 24, 2019 (May 24, 2019)—5 pages (English translation—3 pages).
Extended European Search Report for European Application No. 18771466.2, dated Jan. 30, 2020 (Jan. 30, 2020)—10 pages.
International Search Report and Written Opinion for International Application No. PCT/CN2018/080145, dated Oct. 3, 2019 (Oct. 3, 2019)—9 pages (English translation—5 pages).
1st Examination Report for Indian Application No. 201927043162, dated Jan. 31, 2021 (Jan. 31, 2021)—4 pages.
Rohde-Schwarz et al. "Cell search and cell selection in UMTS LIE," 1MA150_0E, Munich, Germany, Sep. 30, 2009, 40 pages.

* cited by examiner

METHOD AND TERMINAL FOR CELL SELECTION/RESELECTION

CROSS-REFERENCE TO RELATED APPLICATION

This application is a U.S. national phase application of a PCT Application No. PCT/CN2018/080145 filed on Mar. 23, 2018, which claims priority to a Chinese Patent Application No. 201710182378.1 filed in China on Mar. 24, 2017, the disclosure of which is incorporated herein by reference in its entirety.

TECHNICAL FIELD

The present disclosure relates to the field of communication technology, and in particular relates to a method and a terminal for cell selection/reselection.

BACKGROUND

In a Fifth Generation (5G) system, high frequency beamforming is introduced. Together with the high frequency beamforming, a Multi-beam scenario is also introduced. However, this scenario may have an impact on existing schemes including measurement in an idle state, cell selection, and reselection.

However, in the related art, there is no scheme for the measurement in the idle state in the Multi-beam scenario and the cell selection and reselection may not be performed, thus affecting communication reliability.

SUMMARY

A method of and a terminal side device are provided in the present disclosure, so as to solve problems in the related art that there is no scheme for the measurement in the idle state in the Multi-beam scenario and the cell selection/cell reselection may not be performed, thus causing incomplete communication and incapable of guaranteeing communication reliability of a network.

To address the above technical problems, some embodiments provide a method of cell selection or cell reselection. The method includes acquiring measurement configuration information of one or more beams, wherein the measurement configuration information includes the number of one or more beams measured by a terminal; measuring the one or more beams based on the measurement configuration information to acquire a measurement result of each of the one or more beams; performing, based on the measurement result of each of the one or more beams, the cell selection or cell reselection of a cell in which the terminal camps when the terminal is in an idle state.

In another aspect, a terminal is provided in the present disclosure. The terminal includes a first acquisition module, configured to acquire measurement configuration information of one or more beams, wherein the measurement configuration information includes the number of one or more beams measured by a terminal; a second acquisition module, configured to measure the one or more beams based on the measurement configuration information to acquire a measurement result of each of the one or more beams; a selection module, configured to perform, based on the measurement result of each of the one or more beams, cell selection and/or cell reselection of a cell in which the terminal camps when the terminal is in an idle state.

In still another aspect, a terminal is provided in the present disclosure. The terminal includes a storage, a processor, and a computer program stored on the storage and executable on the processor, wherein when the processor executes the computer program, the processor implements the method of cell selection or cell reselection according to the above.

In yet still another aspect, a computer readable storage medium is provided in the present disclosure. The computer readable storage medium includes computer program stored on the computer readable storage medium, wherein, when the computer program is executed by the processor, the processor implements the method of cell selection or cell reselection according to the above.

Beneficial effects of the present disclosure are as follow. In the solutions of the present disclosure, beams are measured, a cell selection and/or a cell reselection of a cell in which the terminal camps when the terminal is in the idle state are performed based on the result of the measurement, thus perfecting a communication flow and ensuring communication reliability in a network.

DETAILED DESCRIPTION

In order to make objects, technical solutions and advantages of the present disclosure clearer, the present disclosure will be described in detail below with reference to accompanying drawings and specific embodiments.

Directed to a problem in the related art that measurement in an idle state in a Multi-beam scenario is not provided and thereby cell selection/reselection are not performed, resulting in incomplete communication and reliability of network communication incapable of being guaranteed, a method and a terminal side device for cell selection/reselection are provided in the present disclosure.

Figure 1:
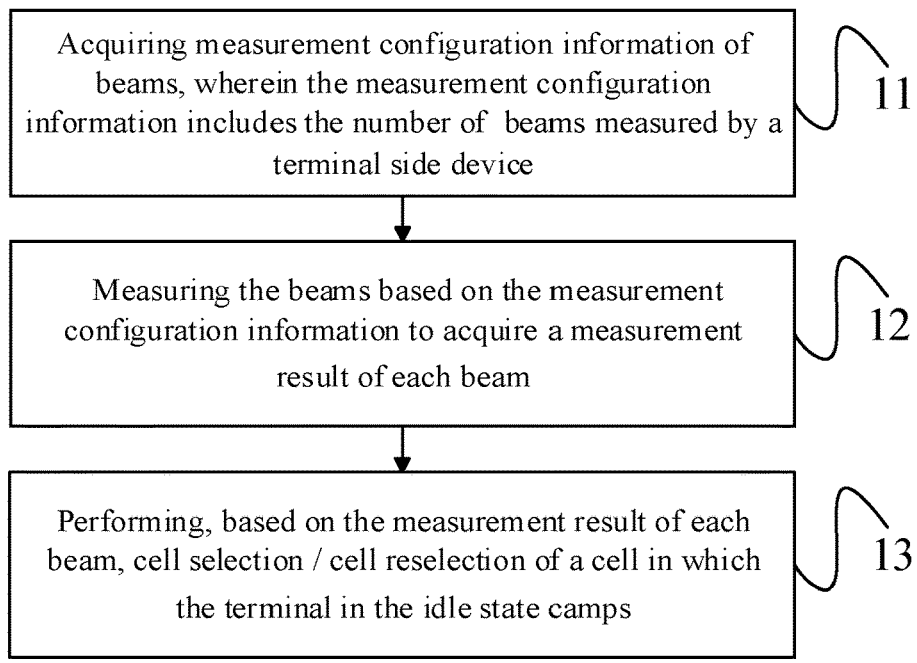
FIG. 1 is a flowchart of a method of cell selection/reselection according to some embodiments of the present disclosure.

As shown in FIG. 1, some embodiments of the present disclosure provide a method of cell selection/reselection. The method includes following steps 11-13.

Step 11: acquiring measurement configuration information of one or more beams, wherein the measurement configuration information includes the number of one or more beams measured by a terminal side device.

It should be noted that the measurement configuration information may be configured by a base station and transmitted by the base station to the terminal side device, or may be configured by the network side through a protocol and notified to the terminal side device. When the measurement configuration information is configured by the base station and transmitted by the base station to the terminal side device, the base station generally transmits the measurement configuration information to the terminal side device through a system broadcast message. Hereinafter, the terminal side device is referred to as a terminal.

Step 12: measuring the one or more beams based on the measurement configuration information to acquire a measurement result of each of the one or more beams;

It should be noted that measuring the one or more beams herein mainly refers to measuring a predefined signal on each of the one or more beams to acquire the measurement result about a quality and a strength of the predefined signal.

Step 13: performing, based on the measurement result of each of the one or more beams, cell selection/cell reselection of a cell in which the terminal in the idle state camps.

It should be noted that the embodiments of the present disclosure perform, based on the measurement result of each of the one or more beams, the selection/reselection of the cell in which the terminal camps when the terminal is in the idle state, thereby ensuring that the terminal may reside in an appropriate cell when the terminal is in the idle state. In this way, guarantee is provided to the terminal for receiving a paging message in the idle state and for subsequently possibly entering a connected state.

In some optional embodiments, a specific implementation of the step 12 including following: measuring a target signal on each of the one or more beams; acquiring a measurement result of a Reference Signal Reception Power (RSRP) and/or a Reference Signal Reception Quality (RSRQ) of each of the one or more beams; wherein the target signal includes at least one of a secondary Synchronization Signal (sSS) and a Demodulation Reference Signal (DMRS); or the target signal includes at least two of the sSS, a primary Synchronization Signal (pSS), and the DMRS.

In this embodiment, the target signal is mainly measured, the larger the RSRP and/or RSRQ acquired through measurement is, the better a quality of the signal is.

It should be noted that when the terminal needs to enter the idle state, cell selection is firstly performed to select an appropriate cell for camping in; when the terminal is already in the idle state, a beam transmitted by the base station may also change with time, the cell in which the terminal initially camps when entering the idle state possibly does not satisfy a camping condition, and under such a condition, cell reselection needs to be performed.

The cell reselection/the cell selection are described in detail below, respectively.

I. The Cell Reselection

Figure 2:
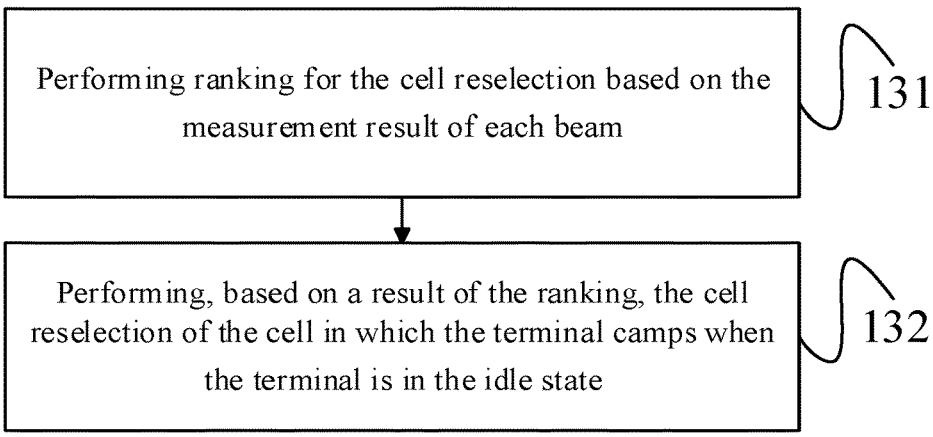
FIG. 2 is a flow chart of implementation of a step 13 in FIG. 1.
Figure 3:
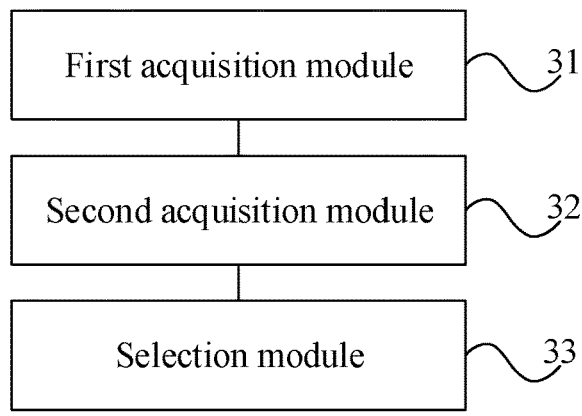
FIG. 3 is a schematic structural diagram of a terminal according to some embodiments of the present disclosure.
Figure 4:
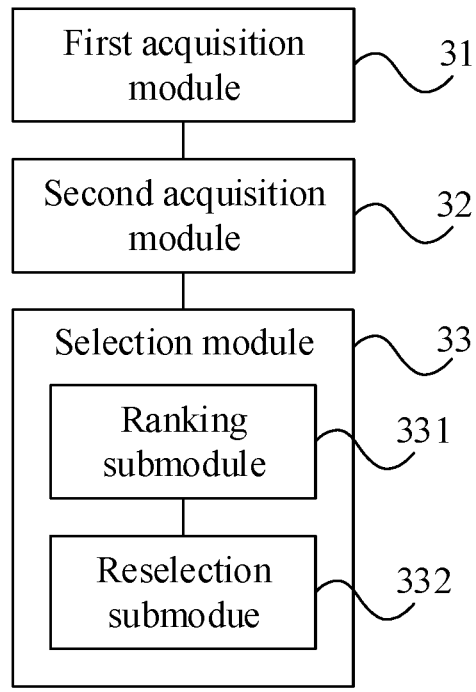
FIG. 4 is a schematic structural diagram of a terminal according to some embodiments of the present disclosure.
Figure 5:
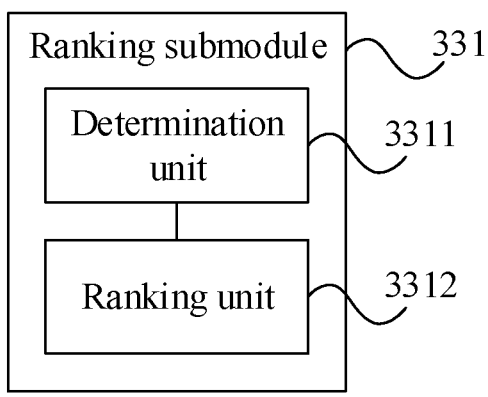
FIG. 5 is a schematic structural diagram of a ranking submodule in FIG. 4.
Figure 6:
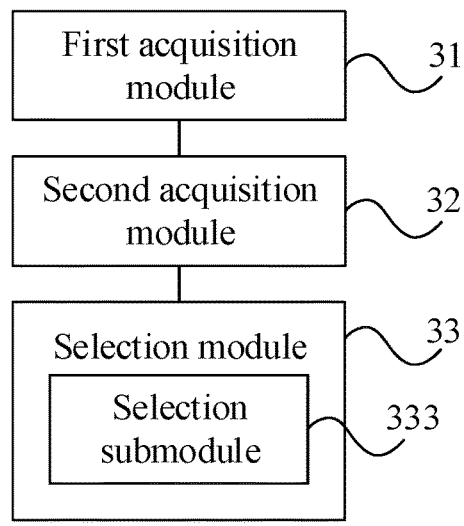
FIG. 6 is a schematic structural diagram of a terminal according to some embodiments of the present disclosure.

When the cell reselection is performed, as shown in FIG. 2, the step 13 includes following steps in a specific implementation.

Step 131: performing a ranking for the cell reselection based on the measurement result of each beam.

It should be noted that, in general, the base station is divided into a plurality of cells, and when the base station transmits beams, the base station transmits beams for each of the cells, and the number of beams transmitted by the base station for each of the cells may be the same or different. When the terminal receives the beams, the terminal also receives the beams for each cell. In this embodiment, the cell selection/cell reselection are performed. Thus, in this step, the cells may be ranked based on the measurement result. Then, the cell reselection is performed based on a ranking result of the cells. The beams may also be ranged based on measurement results of the beams, and since each beam corresponds to a corresponding cell, the cell reselection may be performed after the beams are ranged.

Step 132: performing, based on a result of the ranking, the cell reselection to the cell in which the terminal camps when the terminal is in the idle state.

In this embodiment, through the ranking for the cell reselection, after the ranking is completed, a cell in which the terminal camps when the terminal is in the idle state is directly reselected according to the ranking result, thereby ensuring that the terminal may camp in an appropriate cell when the terminal is in the idle state. In this way, guarantee is provided to the terminal for receiving a paging message in the idle state and for subsequently possibly entering a connected state.

Specific implementations of the step 131 are described in detail below.

A first implementation of the step 131 includes: selecting a first predefined number of beams in each cell of the cells participating in the ranking, and performing the ranking of the cells based on measurement results of the selected first predefined number of beams; wherein the first predefined number of beams includes one beam having an optimal measurement result, a plurality of beams having optimal measurement results, or all beams for each cell.

It should be noted that, when a plurality of beams are used in each cell when performing the ranking of the cells by using the measurement results of the beams, an average value of the measurement results of the beams for each cell may be taken firstly, and then the cells may be ranked based on to the average value. The measurement results of the beams in each cell may also be summed, and then the cells may be ranked based on the summed results. A weighting result of the measurement results of the beams in each cell may also be taken first, and then the cells are ranked based on the weighting result.

The weighting result of the measurement results of the beams in each cell is acquired according to a following formula: the weighting result=A1*beam1+A2*beam2+A3*beam3+ . . . +AN*beamN; wherein beam (n) is the measurement result of the n-th beam, A (n) is a weight value for the n-th beam, and N is the number of beams in the selected cell.

Specifically, specific implementation modes of the first implementation in practical application are as follows:

1. For all cells participating in the ranking, the cells are ranked based on one or more beams having the strongest measurement result of measurement results of all beams measured in the cells participating in the ranking.

In this implementation mode, one or more beams having the strongest measurement result (i.e., one or more beams having the largest measurement result, i.e., one or more beams having the largest RSRP and/or the largest RSRQ) of measurement results of beams in the cells participating in the ranking are selected; and then the selected beams are then ranked in an ascending or a descending order of the measurement results of the selected beams.

2. All cells participating in the ranking are ranked based on measurement results of a predefined number of beams having optimal measurement results in each cell.

In this implementation mode, the predefined number (it should be noted that, the predefined number in this manner may be broadcast to the terminal through a system message, or may be predefined by the network and informed to the terminal; for example, measurement results of beams in each cells are ranked in a descending order, and top 5 beams in the ranking are selected) of beams having optimal measurement results in each cell firstly are selected, and then the measurement results of the predefined number of beams are summed or averaged or are calculated to acquire a weight result of the measurement results. The cells are then ranked in an ascending order or in a descending order.

3. All cells participating in the ranking are ranked based on the measurement results of all beams measured in each of the cells.

In this implementation mode, the measurement results of all beams measured in each of the cells are acquired, and then the measurement results of the all beams are summed or averaged or are calculated to acquire a weight result of the measurement results, and then the cells are ranked in an ascending order or in a descending order.

A second implementation of the step 131 includes: if each cell participating in the ranking includes a second predefined number of beams having measurement results meeting a first predefined condition, ranking the cells based on the measurement results of the second predefined number of beams; wherein the first predefined condition is that a measurement result is greater than or equal to a first predefined threshold or the measurement result satisfies an S criterion of corresponding beams.

Specifically, specific implementation modes of the second implementation in practical application are as follows:

1. For all cells participating in the ranking, if each cell has a predefined number (the predefined number may be broadcast by the base station to the terminal through a system message, or may be predefined by the network and informed to the terminal) of beams having measurement results larger than or equal to a certain threshold (the threshold may be broadcast to the terminal by the terminal through a system system), then the cells are ranked according to the measurement results of the predefined number of beams.

In this implementation mode, whether the predefined number of beams having the measurement results greater than or equal to the certain threshold exists or not in each cell is determined firstly, and if such beams exist in each cell, then the measurement results of the beams in each cell are acquired, and then the measurement results are summed or averaged or are calculated to acquire a weight result of the measurement results, and then the cells are ranked in the ascending order or in the descending order.

2. For all cells participating in the ranking, if each cell has a predefined number (the predefined number may be broadcast by the base station to the terminal through the system message, or may be predefined by the network and informed to the terminal) of beams having measurement results satisfying the S criterion (it should be noted that the S criterion is a S criterion corresponding to the cell selection and the cell reselection) of corresponding beams, the cells are ranked based on the measurement results of the predefined number of beams.

In the implementation mode, whether each cell has the predefined number of beams satisfying the S criterion of the corresponding beams or not is determined firstly, and if such beams exist in each cell, then the measurement results of the beams in each cell are acquired; and the measurement results are then summed or averaged or are calculated to acquire a weight result of the measurement results, and then the cells are ranked in the ascending order or in the descending order.

A third implementation of the step 131 including: ranking cells participating the ranking, based on the number of beams satisfying a second predefined condition in each of the cells, wherein the second predefined condition is that a measurement result is greater than or equal to a second predefined threshold or a measurement result satisfies a S criterion of corresponding beams.

Specifically, specific implementation modes of the third implementation in practical application are as follows:

1. For all cells participating in the ranking, the cells are ranked based on the number of beams having measurement results greater than or equal to a specific threshold in each cell.

In this implementation mode, the number of beams having measurement results greater than or equal to the specific threshold is selected firstly, and then the cells are ranked in the ascending order or the descending order based on the number of the beams in each cell.

2. For all cells participating in the ranking, the cells are ranked based on the number of beams having measurement results satisfying the S criterion of corresponding beams in each cell.

In this implementation mode, beams having measurement results satisfying the S criterion (it should be note that the S criterion is an S criterion applied to the cell selection and the cell reselection) of corresponding beams in each cell are first selected, and then, the cells are ranked in the ascending order or in the descending order based on the number of the beams in each cell.

It should also be noted that in a case that multiple cells have the same number of beams satisfying the second predefined condition, the cells may be ranked in a following manner in which the cells having the same number of beams satisfying the second predefined condition are ranked based on the third predefined number of beams satisfying second predefined condition in each cell.

The third predefined number of beams include all of the beams satisfying the second predefined condition in each cell or beams having optimal measurement results and satisfying the second predefined condition in each cell.

Specifically, specific implementation of the above-mentioned implementation manner in practical application is as follows:

1. When the cells having the same number of beams are ranked, the cells are ranked based on one beam having the strongest measurement result among the beams satisfying the second predefined condition in each cell.

In this implementation mode, a beam having the strongest measurement result (i.e., the beam having the largest measurement result, such as the beam having the largest RSRP and/or the largest RSRQ) is selected from the beams satisfying the second predefined condition in each cell of the cells having the same number of beams, and then the cells are ranked in the ascending order or in the descending order based on the measurement results of the selected beams.

2. When the cells having the same number of beams are ranked, the cells are ranked based on measurement results of all beams satisfying the second predefined condition in each cell.

In this implementation mode, the measurement results of all beams satisfying the second predefined condition in each cell are acquired, and then the measurement results of the beams in each cell are summed or averaged or are calculated to acquire a weight result of the measurement results, and finally the cells are ranked in the ascending order or in the descending order.

A fourth implementation of the step 131 includes: ranking the cells participating in the ranking, based on measurement results of a fourth predefined number of beams in a predefined receiving antenna group in each cell; wherein the fourth predefined number of beams are all beams in the predefined receiving antenna group or beams having optimal measurement results in the predefined receiving antenna group.

It should be noted that the beams in the receiving antenna group may be generated from the same antenna panel or may be generated from different antenna panels.

Specifically, specific implementation modes of the fourth implementation in practical application are as follows:

1. For all cells participating in the ranking, the cells are ranked according to a measurement result of a beam having the strongest measurement result in the predefined receiving antenna group of each cell of the cells participating in the ranking.

In this implementation mode, firstly, the beam having the strongest measurement result (i.e. the beam having the largest measurement result, such as the beam corresponding to the largest RSRP and/or the largest RSRQ) is selected within the predefined receive antenna group of each of the cells participating in the ranking; then the cells are ranked in the ascending order or in the descending order based on measurement results of the selected beams.

2. All cells participating in the ranking are ranked based on measurement results of all beams in the predefined receiving antenna group of each of the cells.

In this implementation mode, the measurement results of all beams in the predefined receiving antenna group of each of the cells are acquired; then the measurement results of the all beams are summed or averaged or the measurement results of the all beams are calculated to acquire a weight result, and then the cells are ranked in the ascending order or in the descending order.

In the above solutions, after the cells are ranked, specific implementation of the step 132 includes selecting a cell having an optimal ranking result (e.g., a cell ranked to be a first cell in descending order) as the cell in which the terminal in the idle state camps.

A fifth implementation of step 131 includes ranking the fifth predefined number of beams according to measurement results of beams, wherein the fifth predefined number is less than or equal to the number of beams measured by the terminal.

It should be noted that this implementation is different from the above-mentioned four implementations in that the above-mentioned implementations rank the cells according to the measurement results of the beams in the cells. In this fifth implementation, beams in the measured cells are directly ranked, and since each beam corresponds to a cell, an appropriate beam (for example, a beam having the largest measurement result) is selected after the beams are ranked. The cell corresponding to the beam is then found, whereby the cell in which the terminal camps when the terminal is in the idle state may be determined.

It should also be noted that the sixth implementation of the step 131 includes: determining a cell quality of each cell according to a measurement result of each beam; ranking the cells for the cell reselection based on the cell quality of each cell.

In this implementation, the quality of each cell is determined firstly, and after the quality of the cell is determined, the cells are ranked in the ascending order or in the descending order of the cells based on the quality of each of the cells.

It should be noted that a first implementation manner of determining the cell quality of each cell based on the measurement result of each beam includes: determining the cell quality of each cell based on measurement results of the sixth predefined number of beams, wherein, the sixth predefined number is the number of beams having the optimal measurement results or is the number of beams having the measurement results higher than a third predefined threshold value.

It should be noted that the sixth predefined number of beams having the optimal measurement results may be one beam having the optimal measurement result, or may be a plurality of beams having the optimal measurement results. In a case that the sixth predefined number is the number of beams having the optimal measurement results, the number may be broadcast by the base station to the terminal through a system message, or may be configured by the base station to the terminal through a dedicated Radio Resource Control (RRC) message. In a case that the sixth predefined number is the number of beams having the measurement results higher than a certain threshold, the number may be notified to the terminal by the base station through a system message broadcast.

It should be noted that the first implementation manner of determining the cell quality of each cell based on the measurement result of each beam includes determining the cell quality of each cell based on the measurement results of the seventh predefined number of beams in the receiving antenna group, wherein, the seventh predefined number is less than or equal to the number of all beams in the receiving antenna group.

It should be noted that in a case that the cell quality is determined by using measurement results of at least two beams, the manner of determining the cell quality includes acquiring a calculation result of the measurement results of the at least two beams, and determining the calculation result as the cell quality; wherein the calculation result is an average value or a sum value of the measurement results of the at least two beams, or a weighting value calculated from the measurement results of the at least two beams.

It should be noted that, in the above solutions, the cell reselection is performed based on a ranking result of cell qualities, and a cell having the best cell quality is selected (for example, a cell ranked to be the first cell in the descending order is selected) as the cell in which the terminal camps after the cell reselection, thus providing a guarantee for receiving the paging message by the terminal in the idle state and for entering a connected state subsequently.

In that above embodiment of the disclosure, through performing the ranking for the cell reselection and then selecting the cell having the best ranking in a ranking result for camping of the terminal, the terminal is provided with good network communication even if the terminal is in the idle state.

It should be noted that, when the terminal is about to enter the idle state, the cell selection for a cell in which the terminal is about to camp is performed firstly in some optional embodiments, the method of cell selection/cell reselection of the present disclosure further includes: determining one or more cell qualities of one or more cells and selecting a cell based on the determined one or more cell qualities.

It should be noted that, when the terminal is about to enter the idle state, cell qualities of cells are determined firstly, and then the terminal will randomly select a cell from cells having cell qualities satisfying a camping condition, as the cell in which the terminal camps when the terminal enters the idle state. After the terminal is already in the idle state, the cell reselection is performed in real time by using the above-mentioned ranking method for the cell reselection, so as to provide guarantee for receiving the paging message by the terminal in the idle state and for entering the connected state subsequently.

Since cells belonging a base station include a cell to which the terminal is currently attached and remaining cells belonging to the base station other than the cell to which the terminal currently is attached, the cell quality of the cell to which the terminal is currently attached may be acquired independently in this embodiment, and a specific implementation of this acquiring includes: determining, based on a measurement result of a beam in the cell to which the terminal is attached, the cell quality of the cell to which the terminal is currently attached.

In a case that the terminal only needs to acquire the cell quality of the cell to which the terminal is currently attached, the cell quality of the cell to which the terminal is currently attached may be quickly and accurately acquired in this implementation. In a case that the cell quality of the cell satisfies a camping condition, the cell is taken directly as the cell in which the terminal camps when the terminal enters the idle state.

It should also be noted that, during acquiring the cell quality, the terminal may need to acquire cell qualities of all cells belonging to the base station to which the terminal is currently connected. Therefore, for this case, an implementation of determining the cell quality of a cell based on the measurement result of each beam in the embodiments of the present disclosure includes determining the cell quality of each cell according to measurement results of an eighth predefined number of beams, wherein the eighth predefined number is the number of beams having the optimal measurement results or the number of beams having the measurement results higher than a third predefined threshold.

It should be noted that the eighth predetermined number of optimal beams may be one or more optimal beams. In a case that the eighth predefined number is the number of beams having the optimal measurement results, the number of the beams may be informed by the base station to the terminal through a system message broadcast, or may be configured by the base station to the terminal through a dedicated Radio Resource Control (RRC) message. In a case that the eighth predefined number is the number of beams having the measurement results higher than the certain threshold, the number of the beams may be notified to the terminal by the base station through the system message broadcast.

In some optional embodiments, another implementation of determining the cell quality of the cell based on the measurement result of each beam includes: determining the cell quality of each cell based on measurement results of a ninth predefined number of beams in the receiving antenna group, wherein, the ninth predefined number is less than or equal to the number of all beams in the receiving antenna group.

It should be noted that in a case that the cell quality of a cell is acquired by using the measurement results of the plurality of beams, an average value or a sum value of the measurement result of the beams or a weighting result calculated from the measurement results of the beams is generally acquired so as to determine the cell quality.

In the embodiments of the present disclosure, a RSRP and/or a RSRQ of a beam is measured, and then the cell quality of a cell is determined based on the measurement result, and then the cell selection is performed for the terminal when the terminal is to enter the idle state. Under a condition that the terminal is already in the idle state, the cell reselection is performed by ranking cells based on measurement results of the cells, and a cell in which the terminal in the idle state camps is reselected based on a result of the ranking, thereby perfecting a 5G communication flow in a 5G system and ensuring reliability of the communication in a 5G network.

As shown in FIG. 3 to FIG. 6, a terminal is further provided in some embodiments of the present disclosure. The terminal includes a first acquisition module 31, a second acquisition module 32, and a selection module 33. The first acquisition module 31 is configured to acquire measurement configuration information of one or more beams, wherein the measurement configuration information includes the number of one or more beams measured by a terminal side device. The second acquisition module 32 is configured to measure the one or more beams based on the measurement configuration information to acquire a measurement result of each of the one or more beams. The selection module 33 is configured to perform, based on the measurement result of each of the one or more beams, cell selection/cell reselection of a cell in which the terminal in the idle state camps.

In some optional embodiments, the first acquisition module 31 is configured to receive the measurement configuration information of one or more beams transmitted by a base station through a system broadcast message.

In some optional embodiments, the second acquisition module 32 is configured to measure a target signal on each of the one or more beams; acquire a measurement result of a Reference Signal Reception Power (RSRP) and/or a Reference Signal Reception Quality (RSRQ) of each of the one or more beams; wherein the target signal includes at least one of a secondary Synchronization Signal (sSS) and a Demodulation Reference Signal (DMRS); or the target signal includes at least two of the sSS, a primary Synchronization Signal (pSS), and the DMRS.

In some optional embodiments, the selection module 33 includes a ranking submodule 331 and a reselection submodule 332. The ranking submodule 331 is configured to perform a ranking for cell reselection based on the measurement result of each beam. The reselection submodule 332 is configured to perform, based on a result of the ranking, the cell reselection of the cell in which the terminal camps when the terminal is in the idle state.

In some optional embodiments, the ranking submodule 331 is configured to select a first predefined number of beams in each cell of the cells participating in the ranking, and perform the ranking of the cells based on measurement results of the selected first predefined number of beams; wherein the first predefined number of beams include a beam having an optimal measurement result, a plurality of beams having optimal measurement results, or all beams in each cell.

In some optional embodiments, the ranking submodule 331 is configured to, if each cell participating in the ranking includes a second predefined number of beams having measurement results meeting a first predefined condition, rank the cells based on the measurement results of the second predefined number of beams; wherein the first predefined condition is that a measurement result is greater than or equal to a first predefined threshold or the measurement result satisfies an S criterion of corresponding beams.

In some optional embodiments, the ranking submodule 331 is configured to rank cells participating the ranking, based on the number of beams satisfying a second predefined condition in each of the cells, wherein the second predefined condition is that a measurement result is greater than or equal to a second predefined threshold or a measurement result satisfies a S criterion of corresponding beams.

In some optional embodiments, the ranking submodule 331 is further configured to, in a case that multiple cells have the same number of beams satisfying the second predefined condition, rank the multiple cells having the same number of beams satisfying the second predefined condition based on measurement results of a third predefined number of beams satisfying second predefined condition in each cell, wherein, the third predefined number of beams include all of the beams satisfying the second predefined condition in each cell or beams having optimal measurement results and satisfying the second predefined condition in each cell.

In some optional embodiments, the ranking submodule 331 is configured to rank cells participating in the ranking, based on measurement results of a fourth predefined number of beams in a predefined receiving antenna group in each cell; wherein the fourth predefined number of beams are all beams in the predefined receiving antenna group or beams having optimal measurement results in the predefined receiving antenna group.

In particular, in a case that beams in each cell of the cells participating in the ranking are at least two beams, an implementation of ranking the cells by using the measurement results of the at least two beams includes: acquiring a calculation result of the measurement results of the at least two beams in each of the cells participating in the ranking, and ranking the cells based on the calculation result, wherein the calculation result is an average value or a sum value of the measurement results of the at least two beams, or a weighting value calculated from the measurement results of the at least two beams.

In some optional embodiments, the ranking submodule 331 is configured to rank a fifth predefined number of beams based on measurement results of beams, wherein the fifth predefined number is less than or equal to the number of beams measured by the terminal. The reselection submodule 332 is configured to select a cell corresponding to a beam having a largest measurement result as the cell in which the terminal camps when the terminal is in the idle state.

In some optional embodiments, the ranking submodule 331 comprises a determination unit 3311 and a ranking unit 3312. The determination unit 3311 is configured to determine a cell quality of each cell based on the measurement result of each beam. The ranking unit 3312 is configured to perform ranking for cell reselection based on the cell quality of each cell.

Specifically, the determination unit 3311 is configured to determine the cell quality of each cell based on measurement results of a sixth predefined number of beams, wherein, the sixth predefined number is the number of beams having optimal measurement results or is the number of beams having measurement results higher than a third predefined threshold; or, determine the cell quality of each cell based on measurement results of a seventh predefined number of beams in a receiving antenna group, wherein, the seventh predefined number is less than or equal to the number of all beams in the receiving antenna group.

In some optional embodiments, the selection module 33 includes a selection submodule 333, configured to determine a cell quality of a cell based on the measurement result of each beam, and select a cell based on the determined cell quality.

In some optional embodiments, the selection submodule 333 is configured to determine, based on a measurement result of a beam in the cell to which the terminal is currently attached, the cell quality of the cell to which the terminal is currently attached.

In some optional embodiments, the selection submodule 333 is configured to determine the cell quality of each cell based on measurement results of an eighth predefined number of beams, wherein the eighth predefined number is the number of beams having the optimal measurement results or the number of beams having the measurement results higher than a third predefined threshold; or determine the cell quality of each cell based on measurement results of a ninth predefined number of beams in a receiving antenna group, wherein, the ninth predefined number is less than or equal to the number of all beams in the receiving antenna group.

In particular, in a case that the cell quality of a cell is determined by using the measurement results of at least two beams, determining the cell quality includes: acquiring a calculation result of the measurement results of the at least two beams, and taking the calculation result as the cell quality, wherein the calculation result is an average value or a sum value of the measurement results of the at least two beams, or a weighting value calculated from the measurement results of the at least two beams.

The terminal of the embodiments of the present disclosure acquires the measurement result of each beam of a predefined number of beams by measuring the predefined number of beams based on the acquired measurement configuration information of the beams, and then, based on the measurement result of each beam, performs cell selection/cell reselection of the cell in which the terminal camps when the terminal is in the idle state, thus perfecting a 5G communication flow in a 5G system and ensuring reliability of the communication in a 5G network.

Figure 7:
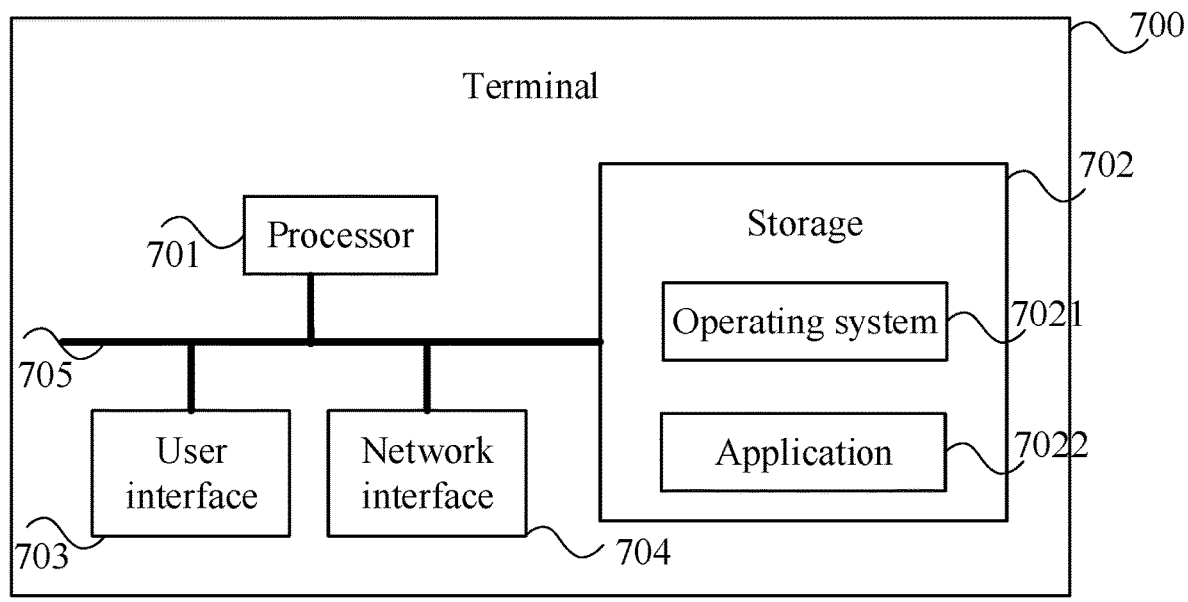
FIG. 7 is a block diagram showing a structure of a terminal according to some embodiments of the present disclosure.

As shown in FIG. 7, FIG. 7 is a structural block diagram of a terminal according to some embodiments of the present disclosure. An application entity to which the method of cell selection/cell reselection provided by the present disclosure is applied is described in detail below in connection with this figure.

A terminal 700 is shown in FIG. 7. The terminal 700 includes at least one processor 701, a storage 702, at least one network interface 704, and a user interface 703. Various components in the terminal 700 are coupled together by a bus system 705. It should be understood that the bus system 705 is used to enable connection and communication among these components. The bus system 705 includes, in addition to a data bus, a power bus, a control bus, and a status signal bus. However, for clarity of illustration, various buses are designated as the bus system 705 in FIG. 7.

The user interface 703 may include a display, a keyboard, or a pointing device (e.g., a mouse, a track ball, a touch pad, or a touch screen, etc.).

It may be understood that the storage 702 in embodiments of the present disclosure may be a volatile storage or a non-volatile storage, or may include both the volatile storage and the non-volatile storage. The nonvolatile storage may be a Read-Only Memory (ROM), a Programmable ROM (PROM), an Erasable Programmable Read Only Memory (EPROM), an Electrically Erasable Programmable Read Only Memory (EEPROM), or a flash memory. The volatile storage may be a Random Access Memory (RAM), which serves as an external cache. By way of example, but not acting as limitation, many forms of RAM may be used, such as a Static Random Access Memory (SRAM), a Dynamic Random Access Memory (Dynamic RAM, DRAM), a Synchronous Dynamic Random Access Memory (Synchronous DRAM, SDRAM), a Double Data Rate Synchronous Dynamic Random Access Memory (DDRSDRAM), an Enhanced Synchronous Dynamic Random Access Memory (ESDRAM), a Synchlink Dynamic Random Access Memory (Synchlink DRAM, SLDRAM) and a Direct Rambus RAM (DRRAM). The storage 702 in the system and the method described herein is intended to include, but is not limited to, these and any other suitable types of memory.

In some embodiments, the storage 702 stores an operating system 7021, an application program 7022, executable modules or data structures, or a subset thereof, or an extended set thereof.

The operating system 7021 includes various system programs, such as a framework layer, a core library layer, and a driver layer, for implementing various basic services and processing hardware-based tasks. The application program 7022 includes various application programs such as a Media Player, a Browser, and the like, and is used to implement various application services. Programs implementing the methods of embodiments of the present disclosure may be included in the application program 7022.

In embodiments of that present disclosure, by invoking programs or instructions stored in storage 702 which may specifically be programs or instructions stored in application program 7022, the processor 701 is configured to acquire measurement configuration information of one or more beams, wherein the measurement configuration information includes the number of one or more beams measured by a terminal side device; measure the one or more beams based on the measurement configuration information to acquire a measurement result of each of the one or more beams; and perform, based on the measurement result of each of the one or more beams, cell selection/cell reselection of a cell in which the terminal in the idle state camps.

The method disclosed by the embodiments of the present disclosure described above may be applied to or implemented by the processor 701. The processor 701 may be an integrated circuit chip with signal processing capability. In implementation, the steps of the method described above may be accomplished by integrated logic circuitry of hardware in the processor 701 or instructions in the form of software. The processor 701 may be a general-purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. The disclosed methods, steps, and logic blocks in embodiments of the present disclosure may be implemented or performed. The general purpose processor may be a microprocessor or the processor may be any conventional processor or the like. The steps of the method disclosed in connection with embodiments of the present disclosure may be implemented directly to be executed in a hardware decoding processor, or to be executed by a combination of hardware in a decoding processor and software modules. The software modules may be located in a storage medium known in the art such as a random access memory, a flash memory, a read only memory, a programmable read only memory, or an electrically erasable programmable memory, registers, etc. The storage medium is located in the storage 702 and the processor 701 reads information in the storage 702 and performs the steps of the method described above in conjunction with its hardware.

It will be appreciated that the embodiments described herein may be implemented in hardware, software, firmware, middleware, microcode, or a combination thereof. For a hardware implementation, a processing unit may be implemented in one or more Application Specific Integrated Circuits (ASICs), a Digital Signal Processor (DSP), a Digital Signal Processing Device (DSP Device, DSPD), a Programmable Logic Device (PLD), an Field-Programmable Gate Array (FPGA), a general purpose processor, a controller, a microcontroller, a microprocessor, other electronic units for performing functions described herein, or combinations thereof.

For a software implementation, techniques described herein may be implemented by modules (e.g., processes, functions, etc.) that perform the functions described herein. Software codes may be stored in a memory and executed by a processor. The memory may be implemented in the processor or external to the processor.

In some optional embodiments, the processor 701 is configured to receive measurement configuration information of a beam transmitted by a base station through a system broadcast message.

In some optional embodiments, the processor 701 is further configured to receive the measurement configuration information of one or more beams transmitted by a base station through a system broadcast message.

In some optional embodiments, the processor 701 is further configured to measure a target signal on each of the one or more beams; acquire a measurement result of a Reference Signal Reception Power (RSRP) and/or a Reference Signal Reception Quality (RSRQ) of each of the one or more beams; wherein the target signal includes at least one of a secondary Synchronization Signal (sSS) and a Demodulation Reference Signal (DMRS); or the target signal includes at least two of the sSS, a primary Synchronization Signal (pSS), and the DMRS.

In some optional embodiments, the processor 701 is further configured to perform a ranking for cell reselection based on the measurement result of each beam; and perform, based on a result of the ranking, the cell reselection of the cell in which the terminal camps when the terminal is in the idle state.

In some optional embodiments, the processor 701 is further configured to select a first predefined number of beams in each cell of the cells participating in the ranking, and perform the ranking of the cells based on measurement results of the selected first predefined number of beams; wherein the first predefined number of beams include a beam having an optimal measurement result, a plurality of beams having optimal measurement results, or all beams in each cell.

In some optional embodiments, the processor 701 is further configured to, if each cell participating in the ranking includes a second predefined number of beams having measurement results meeting a first predefined condition, rank the cells based on the measurement results of the second predefined number of beams; wherein the first predefined condition is that a measurement result is greater than or equal to a first predefined threshold or the measurement result satisfies an S criterion of corresponding beams In some optional embodiments, the processor 701 is further configured to rank cells participating the ranking, based on the number of beams satisfying a second predefined condition in each of the cells, wherein the second predefined condition is that a measurement result is greater than or equal to a second predefined threshold or a measurement result satisfies a S criterion of corresponding beams.

In some optional embodiments, the processor 701 is further configured to, in a case that multiple cells have the same number of beams satisfying the second predefined condition, rank the multiple cells having the same number of beams satisfying the second predefined condition based on measurement results of a third predefined number of beams satisfying second predefined condition in each cell, wherein, the third predefined number of beams include all of the beams satisfying the second predefined condition in each cell or beams having optimal measurement results and satisfying the second predefined condition in each cell.

In some optional embodiments, the processor 701 is further configured to rank cells participating in the ranking, based on measurement results of a fourth predefined number of beams in a predefined receiving antenna group in each cell; wherein the fourth predefined number of beams are all beams in the predefined receiving antenna group or beams having optimal measurement results in the predefined receiving antenna group.

In some optional embodiments, the processor 701 is further configured to: in a case that beams in each cell of the cells participating in the ranking are at least two beams, acquire a calculation result of the measurement results of the at least two beams in each of the cells participating in the ranking, and rank the cells based on the calculation result, wherein the calculation result is an average value or a sum value of the measurement results of the at least two beams, or a weighting value calculated from the measurement results of the at least two beams.

In some optional embodiments, the processor 701 is further configured to rank a fifth predefined number of beams based on measurement results of beams, wherein the fifth predefined number is less than or equal to the number of beams measured by the terminal; and select a cell corresponding to a beam having a largest measurement result as the cell in which the terminal camps when the terminal is in the idle state.

In some optional embodiments, the processor 701 is further configured to determine a cell quality of each cell based on the measurement result of each beam; and perform ranking for cell reselection based on the cell quality of each cell.

In some optional embodiments, the processor 701 is further configured to determine the cell quality of each cell based on measurement results of a sixth predefined number of beams, wherein, the sixth predefined number is the number of beams having optimal measurement results or is the number of beams having measurement results higher than a third predefined threshold; or, determine the cell quality of each cell based on measurement results of a seventh predefined number of beams in a receiving antenna group, wherein, the seventh predefined number is less than or equal to the number of all beams in the receiving antenna group.

In some optional embodiments, the processor 701 is further configured to determine a cell quality of a cell based on the measurement result of each beam, and select a cell based on the determined cell quality.

In some optional embodiments, the processor 701 is further configured to determine, based on a measurement result of a beam in the cell to which the terminal is currently attached, the cell quality of the cell to which the terminal is currently attached.

In some optional embodiments, the processor 701 is further configured to determine the cell quality of each cell based on measurement results of an eighth predefined number of beams, wherein the eighth predefined number is the number of beams having the optimal measurement results or the number of beams having the measurement results higher than a third predefined threshold; or determine the cell quality of each cell based on measurement results of a ninth predefined number of beams in a receiving antenna group, wherein the ninth predefined number is less than or equal to the number of all beams in the receiving antenna group.

In some optional embodiments, the processor 701 is further configured to, in a case that the cell quality of a cell is determined by using the measurement results of at least two beams, acquire a calculation result of the measurement results of the at least two beams, and take the calculation result as the cell quality, wherein the calculation result is an average value or a sum value of the measurement results of the at least two beams, or a weighting value calculated from the measurement results of the at least two beams.

The terminal 700 may implement various processes implemented by the terminal in the foregoing embodiments, and in order to avoid repetition, the detailed description is omitted here.

The terminal of the embodiments of the present disclosure acquires, through the processor 701, acquires measurement configuration information of one or more beams, wherein the measurement configuration information includes the number of one or more beams measured by a terminal side device; measures the one or more beams based on the measurement configuration information to acquire a measurement result of each of the one or more beams; and performs, based on the measurement result of each of the one or more beams, cell selection/cell reselection of a cell in which the terminal in the idle state camps, thus perfecting a 5G communication flow in a 5G system and ensuring reliability of the communication in a 5G network.

Figure 8:
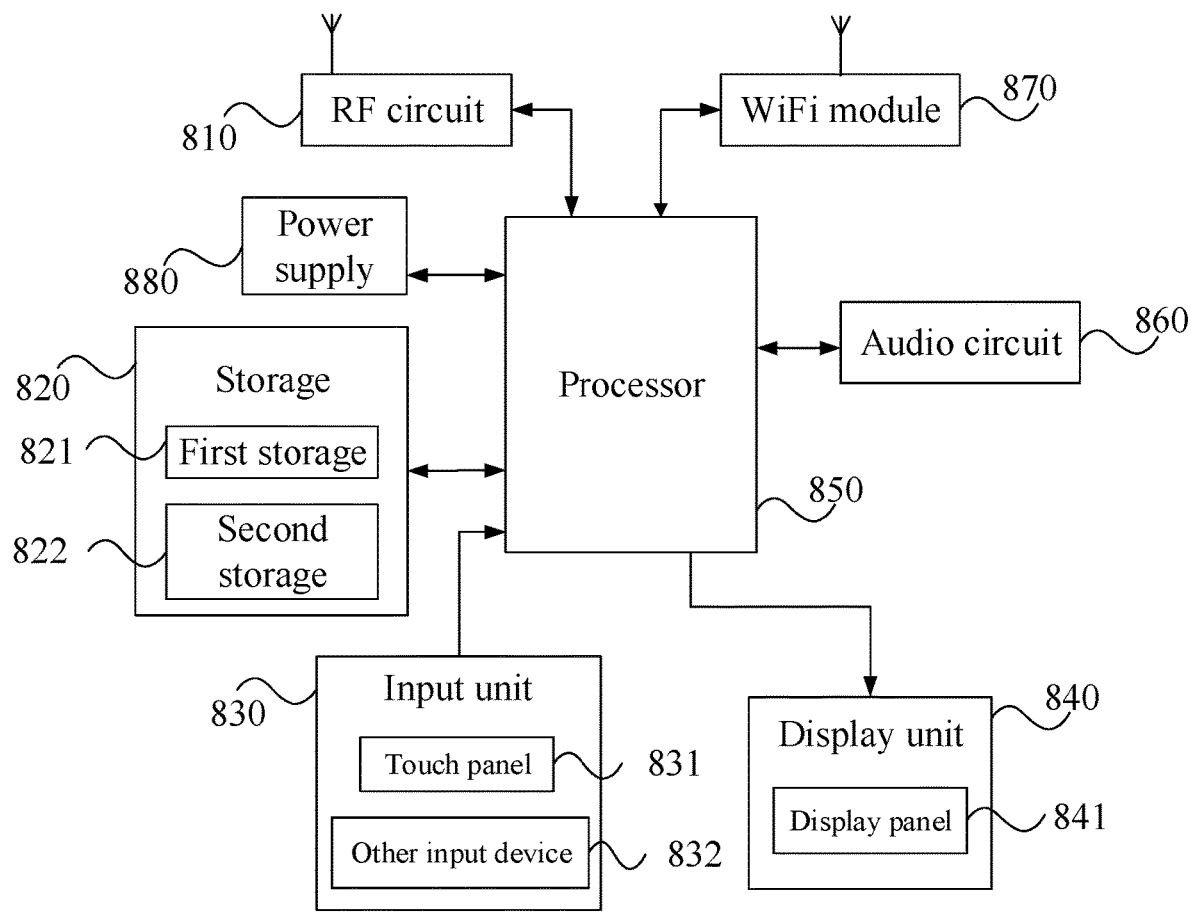
FIG. 8 is a schematic structural diagram of a terminal according to some embodiments of the present disclosure.

FIG. 8 is a schematic structural diagram of a terminal according to some embodiments of the present disclosure. Specifically, the terminal in FIG. 8 may be a mobile phone, a tablet computer, a Personal Digital Assistant (PDA), an in-vehicle computer, or the like.

The terminal in FIG. 8 includes a Radio Frequency (RF) circuit 810, a storage 820, an input unit 830, a display unit 840, a processor 850, an audio circuit 860, a WiFi (Wireless Fidelity) module 870 and a power supply 880.

The input unit 830 may be configured to receive digital information or character information inputted by a user and generate a signal input related to a user setting and a function control of the terminal. Specifically, in the embodiments of the disclosure, the input unit 830 may include a touch panel 831. Touch panel 831, also referred to as a touch screen, may collect user touch operations on or near it (such as user operations on touch panel 831 using any suitable object or accessory such as a finger, a stylus, etc.), and drive a corresponding connecting device based on predefined programs. In some optional embodiments, the touch panel 831 may include two parts, i.e., a touch detection device and a touch controller. Wherein the touch detection device detects a touch orientation of the user, detects a signal caused by the touch operation, and transmits the signal to the touch controller. The touch controller receives touch information from the touch detection device, converts it into contact coordinates, sends it to the processor 850, and may receive and execute commands from the processor 850. In addition, the touch panel 831 may be implemented in various types such as a resistive type, a capacitive type, an infrared ray, and a surface acoustic wave. In addition to the touch panel 831, the input unit 830 may include other input devices 832 that may include, but are not limited to, one or more of a physical keyboard, a function key (such as volume control keys, switch keys, etc.), a trackball, a mouse, joystick, or the like.

The display unit 840 may be configured to display information inputted by the user or information provided to the user and various menu interfaces of the terminal. The display unit 840 may include a display panel 841, and in some optional embodiments, an LCD or an Organic Light-Emitting Diode (OLED) or the like may be employed to configure the display panel 841.

It should be noted that the touch panel 831 may cover the display panel 841 to form a touch display screen. When the touch display screen detects a touch operation on or in the vicinity of the touch display screen, information of the touch operation is transmitted to the processor 850 to determine the type of a touch event. Subsequently, the processor 850 provides a corresponding visual output on the touch display screen according to the type of the touch event.

The touch display screen includes an application interface display area and a common control display area. An arrangement manner of the application interface display area and the common control display area is not limited, and may be an arrangement manner in which two display areas may be distinguished such as an up-down arrangement and a left-right arrangement. The application interface display area may be used to display an interface of an application. Each interface of the application may contain at least one icon of the application and/or interface elements such as widget desktop controls. The application interface display area may also be an empty interface that does not contain any content. The common control display area is used to display control with high utilization rate, such as application icons including setting buttons, interface numbers, scroll bars, phone book icons and so on.

The processor 850 is a control center of the terminal, is connected to various parts of the entire handset by using various interfaces and lines, and by running or executing software programs and/or modules stored in the first storage 821 and invoking data stored in the second storage 822, the processor 850 executes various functions and processing data of the terminal, thereby performing overall monitoring of the terminal. In some optional embodiments, the processor 850 may include one or more processing units.

In the embodiments of the present disclosure, the processor 850 is operable to acquire measurement configuration information of one or more beams, wherein the measurement configuration information includes the number of one or more beams measured by a terminal side device; measure the one or more beams based on the measurement configuration information to acquire a measurement result of each of the one or more beams; perform, based on the measurement result of each of the one or more beams, cell selection/cell reselection of a cell in which the terminal in the idle state camps.

In some optional embodiments, the processor 850 is further operable to receive the measurement configuration information of one or more beams transmitted by a base station through a system broadcast message.

In some optional embodiments, the processor 850 is further operable to measure a target signal on each of the one or more beams; acquire a measurement result of a Reference Signal Reception Power (RSRP) and/or a Reference Signal Reception Quality (RSRQ) of each of the one or more beams; wherein the target signal includes at least one of a secondary Synchronization Signal (sSS) and a Demodulation Reference Signal (DMRS); or the target signal includes at least two of the sSS, a primary Synchronization Signal (pSS), and the DMRS.

In some optional embodiments, the processor 850 is further configured to perform a ranking for cell reselection based on the measurement result of each beam; and perform, based on a result of the ranking, the cell reselection of the cell in which the terminal camps when the terminal is in the idle state.

In some optional embodiments, the processor 850 is further operable to select a first predefined number of beams in each cell of the cells participating in the ranking, and perform the ranking of the cells based on measurement results of the selected first predefined number of beams; wherein the first predefined number of beams include a beam having an optimal measurement result, a plurality of beams having optimal measurement results, or all beams in each cell.

In some optional embodiments, the processor 850 is further operable to, if each cell participating in the ranking includes a second predefined number of beams having measurement results meeting a first predefined condition, rank the cells based on the measurement results of the second predefined number of beams; wherein the first predefined condition is that a measurement result is greater than or equal to a first predefined threshold or the measurement result satisfies an S criterion of corresponding beams.

Wherein, in a case that each of the cells participating the ranking includes a number of beams having measurement results meeting the first predefined condition, the cells are ranked in an order of the number of the beams, i.e., the larger the number of the beams in one of the cells is, the higher the ranking of the one of the cells is.

In some optional embodiments, the processor 850 is further operable to, rank cells participating the ranking, based on the number of beams satisfying a second predefined condition in each of the cells, wherein the second predefined condition is that a measurement result is greater than or equal to a second predefined threshold or a measurement result satisfies an S criterion of corresponding beams.

In some optional embodiments, the processor 850 is further operable to, in a case that multiple cells have the same number of beams satisfying the second predefined condition, rank the multiple cells having the same number of beams satisfying the second predefined condition based on measurement results of a third predefined number of beams satisfying second predefined condition in each cell, wherein, the third predefined number of beams include all of the beams satisfying the second predefined condition in each cell or beams having optimal measurement results and satisfying the second predefined condition in each cell.

In some optional embodiments, the processor 850 is further operable to rank cells participating in the ranking, based on measurement results of a fourth predefined number of beams in a predefined receiving antenna group in each cell; wherein the fourth predefined number of beams are all beams in the predefined receiving antenna group or beams having optimal measurement results in the predefined receiving antenna group.

In some optional embodiments, the processor 850 is further operable to: in a case that beams in each cell of the cells participating in the ranking are at least two beams, acquire a calculation result of the measurement results of the at least two beams in each of the cells participating in the ranking, and rank the cells based on the calculation result, wherein the calculation result is an average value or a sum value of the measurement results of the at least two beams, or a weighting value calculated from the measurement results of the at least two beams.

In some optional embodiments, the processor 850 is further operable to rank a fifth predefined number of beams based on measurement results of beams, wherein the fifth predefined number is less than or equal to the number of beams measured by the terminal; select a cell corresponding to a beam having a largest measurement result as the cell in which the terminal camps when the terminal is in the idle state.

In some optional embodiments, the processor 850 is further operable to determine a cell quality of each cell based on the measurement result of each beam; and perform ranking for cell reselection based on the cell quality of each cell.

In some optional embodiments, the processor 850 is further operable to: determine the cell quality of each cell based on measurement results of a sixth predefined number of beams, wherein, the sixth predefined number is the number of beams having optimal measurement results or is the number of beams having measurement results higher than a third predefined threshold; or, determine the cell quality of each cell based on measurement results of a seventh predefined number of beams in a receiving antenna group, wherein, the seventh predefined number is less than or equal to the number of all beams in the receiving antenna group.

In some optional embodiments, the processor 850 is further operable to determine a cell quality of a cell based on the measurement result of each beam, and select a cell based on the determined cell quality.

In some optional embodiments, the processor 850 is further operable to determine, based on a measurement result of a beam in the cell to which the terminal is currently attached, the cell quality of the cell to which the terminal is currently attached.

In some optional embodiments, the processor 850 is further operable to determine the cell quality of each cell based on measurement results of an eighth predefined number of beams, wherein the eighth predefined number is the number of beams having the optimal measurement results or the number of beams having the measurement results higher than a third predefined threshold; or determine the cell quality of each cell based on measurement results of a ninth predefined number of beams in a receiving antenna group, wherein, the ninth predefined number is less than or equal to the number of all beams in the receiving antenna group.

In some optional embodiments, the processor 850 is further operable to: in a case that the cell quality of a cell is determined by using the measurement results of at least two beams, acquire a calculation result of the measurement results of the at least two beams, and take the calculation result as the cell quality, wherein the calculation result is an average value or a sum value of the measurement results of the at least two beams, or a weighting value calculated from the measurement results of the at least two beams.

The terminal of the embodiments of the present disclosure may implement each method implemented by the terminal in the foregoing embodiments. For sake of brevity, the detailed description of the method is omitted here.

The terminal of the embodiments of the present disclosure acquires, through the processor 850, acquires measurement configuration information of one or more beams, wherein the measurement configuration information includes the number of one or more beams measured by a terminal; measures the number of one or more beams based on the measurement configuration information to acquire a measurement result of each of the one or more beams; and performs, based on the measurement result of each of the one or more beams, cell selection/cell reselection of a cell in which the terminal in the idle state camps, thus perfecting a 5G communication flow in a 5G system and ensuring reliability of the communication in a 5G network.

The various embodiments in this specification are described in a progressive manner, and each embodiment focuses on differences from the other embodiments, and the same and similar parts between the various embodiments may be referred to each other.

Those skilled in the art will appreciate that embodiments of embodiments of the present disclosure may be provided as methods, devices, or computer program products. Hence, embodiments of that present disclosure may take forms of full hardware embodiments, full software embodiment, or embodiments that combine software and hardware aspects. In addition, embodiments of the present disclosure may employ forms of one or more computer-usable storage media (including, but not limit to, a magnetic disk storage, a CD-ROM, and a compact disk and the like) including a computer executable program product.

Embodiments of the present disclosure are described with reference to flowcharts and/or block diagrams of methods, terminal devices (systems), and computer program products according to embodiments of the present disclosure. It should be understood that each flow and/or block in a flowchart and/or a block diagram, as well as a combination of flows and/or blocks in the flowchart and/or the block diagram, may be implemented by computer program instructions. These computer program instructions may be provided to a processor of a general purpose computer, a special purpose computer, an embedded processor, or other programmable data processing terminal device to produce a machine, so that instructions executed by a processor of a computer or other programmable data processing terminal device generate means for implementing functions specified in one or more flows of the flow charts and/or one or more of the blocks of the block diagrams.

These computer program instructions may also be stored in a computer readable storage capable of directing a computer or other programmable data processing terminal device to operate in a particular manner, so that instructions stored in the computer readable storage generate an article of manufacture that includes an instruction device, wherein the instruction device implements functions specified in one or more flows of the flow charts and/or blocks of the one or more block diagrams.

These computer program instructions may also be loaded onto a computer or other programmable data processing terminal device such that a series of operational steps are performed on the computer or other programmable terminal device to produce a computer-implemented process. Therefore, instructions executed on a computer or other programmable terminal device provide steps for implementing functions specified in one or more flows of the flowcharts and/or one or more blocks of the block diagrams.

Although optional embodiments of the present disclosure have been described, additional changes and modifications may be made to these embodiments once those skilled in the art have learned basic inventive concepts. Therefore, the appended claims are intended to be construed as including the optional embodiments and all modifications and modifications falling within the scope of embodiments of the present disclosure.

It should also be noted that, in this context, relational terms such as a first and a second, etc. are used only to distinguish one entity or operation from another entity or operation. Existence of any such actual relationship or order between these entities or operations is not necessarily required or implied. Moreover, a term "comprising", "comprising", "include" or "including" or any other variant thereof is intended to cover a non-exclusive inclusion such that processes, methods, articles or terminal devices including a series of elements include not only those elements, but also include other elements that are not explicitly listed or that are inherent to such processes, methods, articles, or terminal devices. Elements defined by a statement "including one" or the like, if without further limitation, do not exclude the presence of further identical elements in the process, method, article or terminal device including said elements.

What has been described above are optional embodiments of the present disclosure. It should be noted that several improvements and refinements may be made by those of ordinary skill in the art without departing from the principles described herein. These improvements and refinements are also within the scope of the present disclosure.

What is claimed is:

1. A method of cell selection/cell reselection, comprising:
acquiring measurement configuration information of one or more beams, wherein the measurement configuration information comprises the number of one or more beams measured by a terminal;
measuring the one or more beams to acquire a measurement result of each of the one or more beams;
performing, based on the measurement result of each of the one or more beams, the cell selection/cell reselection of a cell in which the terminal camps when the terminal is in an idle state,
wherein performing, based on the measurement result of each of the one or more beams, the cell selection/cell reselection of a cell in which the terminal camps when the terminal is in an idle state, comprises:
performing a ranking for the cell reselection based on the measurement result of each of the one or more beams; and
performing, based on a result of the ranking, the cell reselection of the cell in which the terminal camps when the terminal is in the idle state;
wherein,
performing the ranking for the cell reselection based on the measurement result of each of the one or more beams, comprises:
selecting a first number of beams in each cell of the cells participating in the ranking, and performing the ranking of the cells based on measurement results of the selected first number of beams; wherein the first number of beams comprise all beams in each cell, and in a case that the first number of beams in each cell of the cells participating in the ranking are at least two beams, an implementation of the ranking of the cells based on the measurement results of the at least two beams comprises:
acquiring a calculation result of the measurement results of the at least two beams in each of the cells participating in the ranking, and ranking the cells based on the calculation results of the cells participating in the ranking, wherein the calculation result is a weighting value calculated from the measurement results of the at least two beams;
or,
performing the ranking for the cell reselection based on the measurement result of each of the one or more beams, comprises:
ranking the cells participating in the ranking, based on measurement results of a fourth number of beams in a predefined receiving antenna group in each cell;
wherein the fourth number of beams are all beams in the predefined receiving antenna group;
wherein measuring the one or more beams to acquire the measurement result of each of the one or more beams, comprises:

measuring a target signal on each of the one or more beams, and acquiring a measurement result of a Reference Signal Reception Power (RSRP) and/or a Reference Signal Reception Quality (RSRQ) of each of the one or more beams;
wherein the target signal comprises a Demodulation Reference Signal (DMRS).

2. The method according to claim 1, wherein acquiring measurement configuration information of one or more beams, comprises:
receiving the measurement configuration information of one or more beams transmitted by a base station through a system broadcast message.

3. The method according to claim 1, wherein the target signal further comprises a secondary Synchronization Signal (sSS) and a primary Synchronization Signal (pSS).

4. The method according to claim 1, wherein, in a case of ranking cells participating in the ranking, based on the number of beams satisfying a predefined condition in each of the cells, performing the ranking for the cell reselection based on the measurement result of each of the one or more beams further comprises:
in a case that multiple cells have a same number of beams satisfying the predefined condition, ranking the multiple cells having the same number of beams satisfying the predefined condition based on measurement results of a third number of beams satisfying the predefined condition in each cell,
wherein, the third number of beams comprise all of the beams satisfying the predefined condition in each cell or beams having optimal measurement results and satisfying the predefined condition in each cell.

5. The method according to claim 1, wherein, the weighting value calculated from the measurement results of the at least two beams is acquired according to a following formula:
the weighting value=A (1)*beam(1)+A (2)*beam(2)+A (3)*beam(3)+ . . . +A(N)*beam(N); wherein beam (n) is the measurement result of a n-th beam, A (n) is a weight value for the n-th beam, and N is a positive integer and the number of the at least two beams, and n is a positive integer smaller than or equal to N.

6. The method according to claim 1, wherein performing, based on the measurement result of each of the one or more beams, the cell selection/cell reselection of the cell in which the terminal camps when the terminal is in an idle stat further comprises:
determining a cell quality of a cell based on the measurement result of each beam, and selecting a cell based on the determined cell quality.

7. The method according to claim 6, wherein determining the cell quality of the cell based on the measurement result of each beam, comprises:
determining a cell quality of each cell based on measurement results of an eighth number of beams, wherein the eighth number is the number of beams having optimal measurement results or the number of beams having measurement results higher than a third predefined threshold;
or,
determining the cell quality of each cell based on measurement results of a ninth number of beams in a receiving antenna group, wherein, the ninth number is less than or equal to the number of all beams in the receiving antenna group.

8. The method according to claim 7, wherein in a case that a cell quality of a cell is determined by using measurement results of at least two beams, determining the cell quality comprises:

acquiring a calculation result of the measurement results of the at least two beams, and taking the calculation result as the cell quality, wherein the calculation result is an average value or a sum value of the measurement results of the at least two beams, or a weighting value calculated from the measurement results of the at least two beams.

9. A terminal, comprising:

a storage, a processor, and a computer program stored on the storage and executable on the processor, wherein when the processor executes the computer program, the processor implements a method of cell selection/cell reselection, the method comprises:

acquiring measurement configuration information of one or more beams, wherein the measurement configuration information comprises the number of one or more beams measured by a terminal;

measuring the one or more beams to acquire a measurement result of each of the one or more beams;

performing, based on the measurement result of each of the one or more beams, the cell selection/cell reselection of a cell in which the terminal camps when the terminal is in an idle state, wherein performing, based on the measurement result of each of the one or more beams, the cell selection/cell reselection of a cell in which the terminal camps when the terminal is in an idle state, comprises:

performing a ranking for the cell reselection based on the measurement result of each of the one or more beams; and performing, based on a result of the ranking, the cell reselection of the cell in which the terminal camps when the terminal is in the idle state;

wherein, performing the ranking for the cell reselection based on the measurement result of each of the one or more beams, comprises:

selecting a first number of beams in each cell of the cells participating in the ranking, and performing the ranking of the cells based on measurement results of the selected first number of beams; wherein the first number of beams comprise all beams in each cell, and in a case that the first number of beams in each cell of the cells participating in the ranking are at least two beams, an implementation of the ranking of the cells based on the measurement results of the at least two beams comprises:

acquiring a calculation result of the measurement results of the at least two beams in each of the cells participating in the ranking, and ranking the cells based on the calculation results of the cells participating in the ranking, wherein the calculation result is a weighting value calculated from the measurement results of the at least two beams;

or, performing the ranking for the cell reselection based on the measurement result of each of the one or more beams, comprises:

ranking the cells participating in the ranking, based on measurement results of a fourth number of beams in a predefined receiving antenna group in each cell;

wherein the fourth number of beams are all beams in the predefined receiving antenna group;

wherein, measuring the one or more beams to acquire the measurement result of each of the one or more beams, comprises:

measuring a target signal on each of the one or more beams, and acquiring a measurement result of a Reference Signal Reception Power (RSRP) and/or a Reference Signal Reception Quality (RSRQ) of each of the one or more beams;

wherein the target signal comprises a Demodulation Reference Signal (DMRS).

10. The terminal according to claim 9, wherein acquiring measurement configuration information of one or more beams, comprises:

receiving the measurement configuration information of one or more beams transmitted by a base station through a system broadcast message.

11. The terminal according to claim 9, wherein the target signal further comprises a secondary Synchronization Signal (sSS) and a primary Synchronization Signal (pSS).

12. The terminal according to claim 9, wherein, in a case of ranking cells participating the ranking, based on the number of beams satisfying a predefined condition in each of the cells, performing the ranking for the cell reselection based on the measurement result of each of the one or more beams further comprises:

in a case that multiple cells have a same number of beams satisfying the predefined condition, ranking the multiple cells having the same number of beams satisfying the predefined condition based on measurement results of a third number of beams satisfying the predefined condition in each cell, wherein, the third number of beams comprise all of the beams satisfying the predefined condition in each cell or beams having optimal measurement results and satisfying the predefined condition in each cell.

13. The terminal according to claim 9, wherein, the weighing value calculated from the measurement results of the at least two beams is acquired according to a following formula:

the weighting value=A (1)*beam(1)+A (2)*beam(2)+A (3)*beam(3)+ . . . +A(N)*beam(N): wherein beam (n is the measurement result of a n-th beam, A (n) is a weight value for the n-th beam, and N is a positive integer and the number of the at least two beams, and n is a positive integer smaller than or equal to N.

14. The terminal according to claim 9, wherein performing based on the measurement result of each of the one or more beams, the cell selection/cell reselection of the cell in which the terminal camps when the terminal is in an idle state, further comprises:

determining a cell quality of a cell based on the measurement result of each beam, and selecting a cell based on the determined cell quality.

15. The terminal according to claim 14, wherein determining the cell quality of the cell based on the measurement result of each beam, comprises:

determining a cell quality of each cell based on measurement results of an eighth number of beams, wherein the eighth number is the number of beams having optimal measurement results or the number of beams having measurement results higher than a third predefined threshold;

or, determining the cell quality of each cell based on measurement results of a ninth number of beams in a receiving antenna group, wherein, the ninth number is less than or equal to the number of all beams in the receiving antenna group.

16. The terminal according to claim 15, wherein in a case that a cell quality of a cell is determined by using measurement results of at least two beams, determining the cell quality comprises:

acquiring a calculation result of the measurement results of the at least two beams, and taking the calculation result as the cell quality, wherein the calculation result is an average value or a sum value of the measurement results of the at least two beams, or a weighting value calculated from the measurement results of the at least two beams.

* * * * *